United States Patent [19]

Cummings

[11] E Re. 28,569

[45] Reissued Oct. 14, 1975

[54] IN SITU PROCESS FOR TRANSISOMERIZATION AND CONJUGATION OF RESINS CONTAINING FATTY ACID ESTERS

[75] Inventor: Lowell O. Cummings, San Anselmo, Calif.

[73] Assignee: PVO International Inc., San Francisco, Calif.

[22] Filed: June 25, 1973

[21] Appl. No.: 372,949

Related U.S. Patent Documents

Reissue of:

[64] Patent No.: 3,668,159
Issued: June 6, 1972
Appl. No.: 101,057
Filed: Dec. 23, 1970

[52] U.S. Cl. ..... 260/18 EP; 117/124 E; 117/134; 117/148; 117/154; 117/167; 260/22 R; 260/22 EP; 260/22 T

[51] Int. Cl. ..... C08g 17/16

[58] Field of Search ..... 260/22 R, 22 EP, 18 EP, 260/22 T, 117/167

[56] References Cited

UNITED STATES PATENTS

| | | | |
|---|---|---|---|
| 1,889,923 | 12/1932 | Kienle | 260/22 |
| 2,004,880 | 6/1935 | Rosenblum | 260/22 |
| 2,462,046 | 2/1949 | Wyler | 260/22 |
| 2,504,518 | 4/1950 | Greenlee | 260/22 |
| 2,731,429 | 1/1967 | Cody et al. | 260/22 |
| 2,786,773 | 3/1957 | Bradley, Jr. | 260/22 |
| 3,027,340 | 3/1962 | Masters | 260/22 |

FOREIGN PATENTS OR APPLICATIONS

| | | | |
|---|---|---|---|
| 544,482 | 4/1942 | United Kingdom | 260/407 |

OTHER PUBLICATIONS

"Varnish Constituents", Chatfield, pages 3–4, 16–17,, 41, 86, 101, 103, 107, 108, Leonard Hill Ltd., London, 1953.

"Technology of Paints, Varnishes, and Lacquers", by Martens, pages 33–42, and 95–99, Rheinhold Book Corp., N.Y., 1968.

*Primary Examiner*—Eugene C. Rzucidlo
*Attorney, Agent, or Firm*—Owen, Wickersham & Erickson

[57] ABSTRACT

A method is provided for producing resins or esters from starting esterifiable components and polyunsaturated, nonconjugated fatty acids whereby the mass is heated in intimate admixture with sulfur dioxide gas to effect conjugation in situ and also rearrangement to provide increased isolated trans double bonds. The esterifiable components are suitably epoxy resins or alkyd-forming mixtures.

18 Claims, 2 Drawing Figures

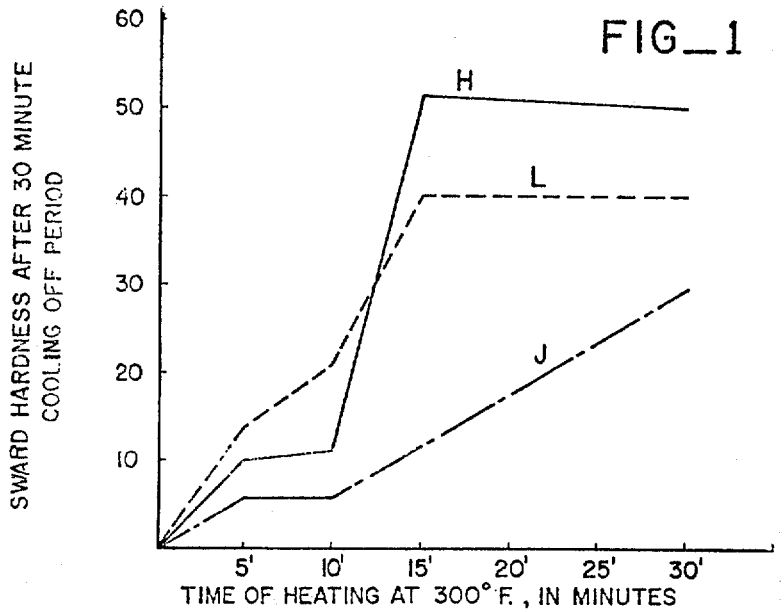
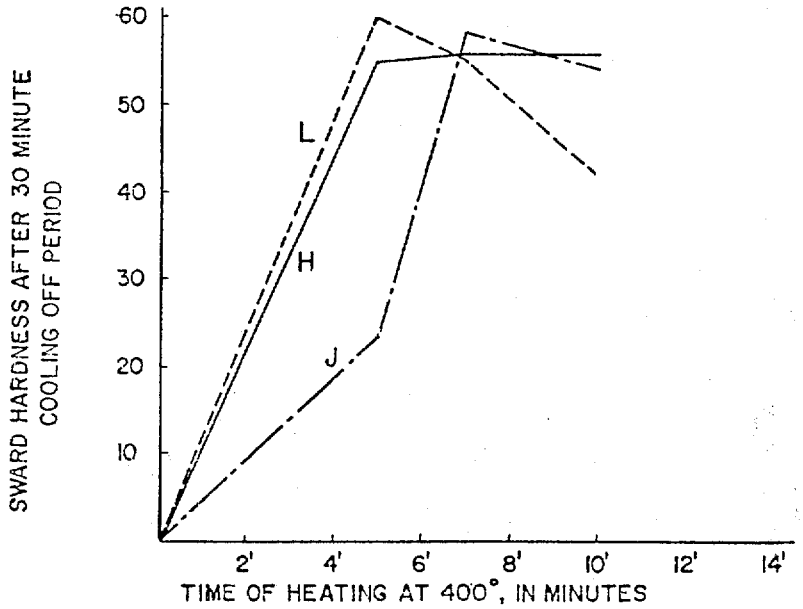
FIG_2

IN SITU PROCESS FOR TRANSISOMERIZATION AND CONJUGATION OF RESINS CONTAINING FATTY ACID ESTERS

Matter enclosed in heavy brackets [ ] appears in the original patent but forms no part of this reissue specification; matter printed in italics indicates the additions made by reissue.

BACKGROUND OF THE INVENTION

This invention concerns the production of resins, and, more particularly, it concerns the production of resins by a method including the reaction and rearrangement of a polyunsaturated unconjugated fatty acid with another resin-forming component.

Coating resins made of unsaturated fatty acids and another resin-forming component have long been known in the art, and the superiority of such resins containing conjugated double bonds over those not so conjugated has also been recognized. Thus, it has heretofore been the practice to use a conjugated fatty acid or an ester thereof as a starting component in making a resin, especially for use as a coating material, and such conjugated fatty acid component has been a naturally occurring substance, such as tung oil or tung oil fatty acids. Alternatively it has been a preconjugated fatty acid or ester wherein the polyunsaturation will have been rearranged to provide a major portion of conjugated unsaturation such as dehydrated castor oil fatty acids. The resin-forming components, e.g., alkyd resin or epoxy ester, and conjugated fatty acid component, are mixed together and heated to a temperature of, for example, from 450° to 525° F. The conjugated fatty acids or their esters are very prone to cross-link under such heating and consequently the conjugation is being consumed during the resin manufacturing process. Therefore, the conjugation content of the resin always goes down during the resin manufacture. Typically, at least half of the conjugation is consumed during conventional resin manufacture according to prior art methods. Such cross-linking also results in increased viscosity of the final resin. The above disadvantages are overcome by the present invention wherein the starting fatty acid component is polyunsaturated nonconjugated fatty acid or ester thereof and conjugation is generated or effected during resin manufacture itself. At the end of the resin manufacture of this invention, more conjugation is usually present than in resins made from conjugated fatty acids or esters thereof by the prior art methods. In addition, the final resins of the present method tend to be less viscous than those made by prior art methods. A further advantage is that the method of the present invention results in an increased proportion of isolated trans double bonds over that obtained in prior art methods.

SUMMARY OF THE [INVENTION] *DISCLOSURE*

This invention relates to the production of resins, especially resins which are useful as coating materials, e.g., for coating wood, metal, glass, paper or any other desired substrate.

The method of the invention comprises, particularly, heating an admixture of a resin-forming or an ester component and a nonconjugated fatty acid component at reaction temperature in intimate contact with sulfur dioxide gas, $SO_2$, to effect reaction between such components and to cause rearrangement of a significant portion of the double bonds, or unsaturation, in the fatty acid component, to conjugated state, to form a coating resin having generally improved properties as compared with coating resins made with conjugated fatty acid components as starting materials.

The resin-forming or ester component of the starting admixture can be an epoxy resin or it can be an alkyd-forming mixture, e.g., of (a) a glyceride oil or an unsaturated fatty acid and (b) a polybasic carboxylic acid or its anhydride, such as isophthalic acid, phthalic acid anhydride and (c) of a polyhydric alcohol such as glycerol, glycol, pentaerythritol or the like. Where an epoxy resin is employed, it is that product formed by reaction of bisphenol A and epichlorhydrin, such reaction products being well known in this art. Such a reaction is typified by the following reaction:

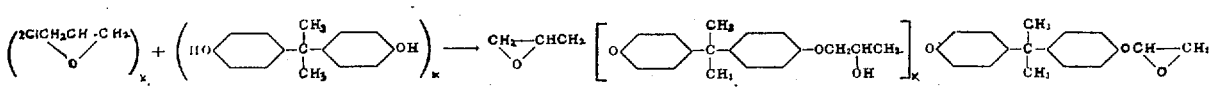

The epoxy esters useful in the present invention are liquefiable at the temperature of reaction and have a weight per epoxy group of from 875–1,025 and a Gardner-Holdt viscosity of from R to U at 40 percent nonvolatiles in butyl Carbitol (trademark for diethylene glycol monobutyl ether sold by Union Carbide Corp.).

The alkyd-resin-forming starting admixture can comprise a fatty-acid-providing component or material, a polybasic carboxylic acid such as isophthalic acid or phthalic anhydride and a polyhydric alcohol in such amounts as to provide a mixed ester, or resin, of the components. The polyhydric alcohol can be, for example, glycerol, ethylene glycol, pentaerythritol, or [trimethyllol] *trimethylol* ethane.

The fatty acid-providing component can be a polyunsaturated nonconjugated fatty acid containing from 16 to 22 carbon atoms and having isolated double bonds in the chain; or it can be an ester thereof from alcohols such as glycerol, *ethylene* glycol, pentaerythritol, or [methyl alcohol or ethyl alcohol] *trimethylol ethane*. A very useful starting material of this type is a glyceride or fatty oil containing a substantial amount of the fatty acid described, such as *linoleic acid, e.g.*, safflower oil, [linseed oil], sunflower oil, soy oil, or walnut oil. *Linoleic-acid-enriched* tall oil fatty acids and segregated polyunsaturated cottonseed oil fatty acids are also useful. Where a glyceride is employed, it also provides at least a portion of the polyhydric alcohol for the alkyd-resin-forming starting mixture. Where an epoxy resin is the starting component, it is preferred to react with the suitable fatty acid. Linoleic acid occurs widely in many resin raw materials and is most useful in the present invention. This acid contains two isolated, i.e., nonconjugated, double bonds.

In carrying out the method of this invention, the resin-forming admixture as [or] *described* above is heated to a temperature of from about 425° F. to about 550° F., preferably at from about 430° F. to 500° F., in intimate admixture with $SO_2$ gas from any described source. In a preferred mode of operation, the gas is bubbled through the hot, liquid mixture in a reaction vessel or in countercurrent flow through a tower, or otherwise as desired. Advantageously, the $SO_2$ is fed through the reaction mixture at a rate of from 0.1 to 2.0 liters per minute per 1,000 gm. charge of reaction mixture and very good results are obtained by using about 0.83 liter per minute per 1,000 gm. charge of 2 liters per minute per 2,400 gm. charge. Reaction is continued with introduction of the gas and heating at the temperatures given above until the desired properties are obtained, which are determined by extracting samples of the mixture and ascertaining acid value, viscosity etc. At the end of the reaction, gas flow is discontinued, the $SO_2$ is purged from the resin by blowing in a fast stream of inert gas such as nitrogen or carbon dioxide, and the product is recovered. In the method of this invention there are suitably used from 30 to 90 parts by weight of the fatty acid component, based on the weight of the fatty acid radical, to from 70 to 10 parts by weight of the ester-forming component, i.e., the epoxy resin or the polybasic alcohol-polybasic acid component.

It is an important advantage of the present invention that the use of $SO_2$ very quickly effects as a first step rearrangement of a substantial portion of naturally occurring cis configuration of the double bonds to the trans configuration. This is desirable for several reasons as will be shown below. As a secondary rearrangement in the present process, a portion of the double bonds which are separated by one methylene group, become conjugated. [that is, they shift to positions adjacent one another.] This conjugation is continuously generated during the resin manufacturing process while sulfur dioxide is being blown through the reaction mass. The product of this invention exhibits higher than normal trans-trans conjugation, i.e., higher than the products of the known art.

There are several reasons why conjugation and the formation of isolated trans double bonds are desirable. Coatings containing conjugation are superior to coatings without conjugation in the following ways:

1. Films of these resins heat polymerize faster; that is, they cure faster and harder. It is obvious that anything that can be done to cut down on extensive baking time and heat requirements is a very big advantage.
2. In our case, conjugation and the formation of isolated trans double bonds results in lighter colored films on baking.
3. Baked conjugated films are more chemically resistant than unconjugated films.
4. The cured films are less subject to subsequent oxidation because of the predominance of isolated trans isomers. The oxidation of trans isomers is slower than cis isomers as shown in a paper by Rheineck and Zimmerman. *A.E. Rheineck and Dallas D. Zimmerman, Fette Seifen Anstrichmittel 71,869 [1969]. It is believed that there is also another benefit in air dried films containing trans double bonds because they will subsequently be very slow on postoxidation.
5. The rearranged resins can be copolymerized with various monomers, such as styrene and methyl methacrylate, to give clear tough films. The resins which are not rearranged copolymerize with monomers with difficulty resulting heterogeneous products of poor quality. This is solution polymerization. The advantage of conjugating during resin manufacture gives great economies. The common way to manufacture conjugated resins is to start with fatty acid raw materials which are already conjugated. Examples of these would be conjugated safflower oil 122-G, dehydrated castor oil fatty acids, tung oil and tung oil fatty acids. These materials are incorporated in the desired resin easily [be] *by* esterification or transesterification. The resins commonly used here are alkyd resin and epoxy esters. When these conjugated oils are incorporated in these reins, the incorporation has to take place by heating at rather high temperatures, typically, 450° to 525° F. The esterification does not readily take place below this temperature. Conjugated fatty acids or their esters are very prone to cross-link by heat and, as cross-linking consumes the conjugated double bonds, the conjugation is being consumed during the resin manufacturing process. Therefore, the conjugation content of the resin will always go down during the resin manufacture. Typically, at least half of the conjugation is consumed during resin manufacture. On the other hand, in our process conjugation is generated throughout the resin manufacturing process and at the end of the resin manufacture more conjugation can result than from the process in which a preconjugated oil or fatty acid is originally used. It also turns out that because conjugated materials cross-link during resin manufacture, resin viscosity consequently builds up. In the present invention, however, where conjugation is done in situ, the resulting material can be less viscous than if the conjugated oil or fatty acid were used as a starting material. This is because some cross-linking is already present in the conjugated oils before they are made into a resin.

The rearrangement of double bonds by sulfur dioxide is different than other rearranging methods which conjugate. As mentioned before, the first thing that happens is that sulfur dioxide causes most of the isolated double bonds to change from cis to trans. Subsequently, conjugation is usually generated from the isolated trans bonds. The conjugation by sulfur dioxide results in two species - the cis-trans and the trans-trans. Sulfur dioxide normally produces about 1½ to 2 parts of trans-trans conjugation for every 1 part of cis-trans conjugation. There also may be a small amount of cis-cis conjugation. It is known that the trans-trans conjugated systems are considerably more reactive to heat than the cis-trans.

The available linoleic acid-containing conjugated oils are very few. The principal one in the industry is dehydrated castor oil containing about 90 percent or so of linoleic acid, and of this 90 percent, about 25 percent is conjugated. The content of the conjugation is as follows: About two-thirds is cis-trans and about one-third is trans-trans, and the predominance of cis-trans conjugation means that the product does not react quite as readily to heat as does sulfur dioxide conjugated material which has a predominance of reactive trans-trans conjugation.

BRIEF DESCRIPTION OF THE DRAWINGS

The invention will be illustrated by the description and by the annexed drawings which are illustrative and not limitative and modifications and variations can be made therein without departing from the spirit and scope of the appended claims.

In the drawings:

FIG. 1 is a graph showing relative Sward hardnesses of products made not according to the invention and according to the invention when coated on steel and baked at 300° F. as described.

FIG. 2 is similar to FIG. 1 except that baking is done at 400° F.

DETAILED DESCRIPTION OF THE INVENTION

The invention and some modes of carrying it out will be demonstrated by the following specific examples which are given as illustrative only and not as limitative.

In a series of tests, esters were made by reacting the same epoxy resin, available in commerce under the trademark Araldite 6084, made and sold by CIBA Products Co., of Summit, N.J., and commonly used for making epoxy esters, with an unsaturated fatty acid mixture having isolated double bonds and using the method of this invention (Test A); with an unsaturated, unconjugated fatty acid mixture, without introduction of $SO_2$ (Test B); and with a mixture of preconjugated fatty acids [.] (*Test C*).

In test A, the starting mixture comprises 50 percent by weight of Araldite 6984 which is derived by reacting bisphenol A and epichlorhydrin in the known manner, (and which has a weight per epoxy group of 875–1,025, and a Gardner-Holdt viscosity of R to U at 40 percent nonvolatile in solution to butyl Carbitol); and 50 percent by weight of the fatty acid component, which in this test is a mixture available in commerce under the trademark Pamolyn 200, made and sold by Hercules Inc., and which contains linoleic acid-enriched tall oil fatty acids containing 81 percent unconjugated linoleic acid and about 18 percent oleic acid, the remainder being small amounts of saturated acids, unsaponifiable material and rosin. The mass is heated to 500° F. and maintained at that temperature in a suitable vessel for one hour while nitrogen was bubbled through the mixtures and subsequently [vessel] bubbling $SO_2$ therethrough for two hours at a rate of 2 liters per minute per 2,400 grams of reaction mass or charge. Purging follows, as by a stream of nitrogen. The product is then recovered.

In Test B, the charge to the reaction zone comprises 50 percent by weight of the same Araldite resin as in Test A and 50 percent by weight of the same Pamolyn 200 fatty acid component as in Test A. This batch is heated in the same manner at 500° F. but for 4 hours 30 minutes without addition of $SO_2$, and the product is thereafter recovered.

In Test C, the charge to the reaction zone comprises 50 percent by weight of the same Araldite resin as in Tests A and B, and 50 percent by weight of dehydrated castor oil fatty acids which are conjugated, and the charge is heated at 500° F. for 3 hours 45 minutes without addition of $SO_2$, after which the product was recovered.

The characteristics of the products are shown in Table I below:

TABLE I

| | Test A | Test B | Test C |
|---|---|---|---|
| Color (50% Xylene) | 4 | 4+ | 4 |
| Gardner-Holdt Viscosity (50% Xylene) | 4.3 Stokes, Q | 1.6 Stokes, G | 14.4 Stokes, X–½ |
| Acid Value (100% N.V.) | 6.7 | 3.8 | 9.8 |
| Conjugation* | | | |
| Cis-Trans | 3.50% | 0 | 7.5% |
| Trans-Trans | 4.20% | 0 | 2.77% |
| Isolated Trans | 19.7% | 0 | 9.3% |

*Determined by infra red spectra analysis. Absorptions of trans-trans conjugation is at 10.15 microns, cis-trans at 10.55 microns and isolated trans at 10.35 microns. Interferring peaks from resin absorption were eliminated by cancelling from an unconjugated resin.

The products were respectively coated onto steel panes 4 × 12 inch in size with incorporation of 0.02% Mn drier and were applied with a No. 18 rod and baked at 300° F, showing the following Sward hardness values:

TABLE II

| | Test A | Test B | Test C |
|---|---|---|---|
| 5 minutes | 10 | 6 | 13 |
| 10 minutes | 11 | 6 | 20 |
| 15 minutes | 39 | 11 | 40 |
| 30 minutes | 46 | 29 | 41 |

It can be seen from the above that the incorporation of $SO_2$ effects conjugation in the unsaturated fatty acid (comparing Tests A and B) and increases the amount of trans-trans conjugation (comparing Tests A and C). also, the Sward hardness is increased over the nonconjugated acid-containing product and compares well with the preconjugated acid-containing product, showing superior hardness at 30 minutes.

In another series of tests, alkyd resins are produced. In each test, the following starting charge is used:

45 parts by weight of fatty oil 41.5 parts by weight of isophthalic acid (isophthalic acid grade 95 produced by Amoco Chemical Company and containing 95 parts of isophthalic acid and 5 parts of terephthalic acid)

22.5 parts by weight glycerine (99.5 percent purity).

In Test G an alkyd resin or mixed ester product is made according to the invention by acidolysis, that is, by heating isophthalic acid and nonbreak safflower oil together in a suitable vessel at 530° F. until an interchange takes place forming a partial glyceride or glycerides of fatty acids and isophthalic acid. Then the temperature is lowered to 430° F. and esterification is continued until the product exhibits the desired properties, and the product is recovered. In this test, in situ conjugation is effected, by blowing sulfur dioxide gas through the hot liquid reaction mass during the acidolysis step and during the esterification step at a rate of 2 liters per minute of sulfur dioxide per 2,500 grams of charge.

In Tests D, E, and F, the reaction was started by alcoholizing the oil and glycerine, with addition of 0.002 parts by weight of lithium hydroxide monohydrate, and alcoholysis was done with heating at 450° F. under an inert atmosphere, e.g., of nitrogen or other inert gas. Alcoholysis was complete when two parts by weight of the reaction mass were soluble in one party by weight of methanol. Then the isophthalic acid was added and a stream of inert gas maintained through the mass to carry off water. Esterification was done at 430° F. until desired properties, e.g., acid value and viscosity were obtained. The product of each test was recovered and the properties of the products D, E, and F, and the respective starting oil are shown in Tables III and IV.

TABLE III

| Starting oil | D Non-break Saf-flower oil | E Conju-gated Saf-flower oil | F Dehy-drated castor oil | G Nonbreak Safflower oil: in situ conjugation |
|---|---|---|---|---|
| Properties at 50% solids in xylene: | | | | |
| Viscosity at 25°F | (1) | (2) | (3) | (4) |
| Gardner color | 1–2 | 2–3 | 3–4 | 3 |
| Conjugation (done by method shown in Table I): | | | | |
| Cis-trans, percent | 0 | 2.26 | 5.22 | 2.44 |
| Trans-trans, percent | 0 | 4.78 | 3.33 | 5.84 |
| Isolated trans, percent | 0 | 21.3 | 7.0 | 22.9 |
| Properties at 100% solids in xylene | | | | |
| Acid number | 8.8 | 23.5 | 23.8 | 12.8 |

(1)8 Stokes V–
(2)40.4 Stokes Z 2½
(3)35.1 Stokes Z 2–
(4)23 Stokes Z+

The products were coated onto steel panels in the same manner as described for Table II above, and treated in various ways, the treatments and results being shown in table IV.

It can be seen that a superior coating or film is provided by the alkyd product of this invention which exhibits excellent resistance to the modes of attack tested. The product of Test G has a total of 8.28 percent conjugation and 23 poise viscosity whereas that of Test E (using preconjugated oil) has a total of 8.04 percent conjugation and 40.4 poise viscosity. Thus, the product made according to this invention with in situ conjugation has higher conjugation and lower viscosity than the product having starting conjugated safflower oil, and the product of this invention exhibits generally better chemical properties.

In a further series of tests, Tests H, [I] *L*,J, the epoxy resin described above, Araldite 6084, is reacted with the amounts shown of Pamolyn 200 described above, Pamak I which is made and sold by Hercules incorporated and which consists of about 45 percent linoleic acid, 49 percent oleic acid, 3 percent saturated fatty acids, plus small amounts of rosin and unsaponifiable matter; or Pamak 4A which consists of essentially the same composition but with slightly more rosin acids and unsaponifiables, or DCOFA (dehydrated castor oil fatty acids). Table V shows heating times and the properties of the products, the reaction being carried out in the same manner as described above with Araldite 6084.

TABLE V

| | H | [I] *L* | J |
|---|---|---|---|
| Epoxy Component | 6084–50% | 6084–50% | 6084–50% |
| Fatty Acid Component | Pamolyn 200–50% | Pamolyn 200–50% | DCOFA–50% |
| Starting mat. Conjugated | No | No | Yes |
| Cooking Time | 3 hrs. 45 min. | 4 hrs. 30 min. | 3 hrs. 45 min. |
| $SO_2$ added | Yes | No | No |
| Color in 50% Xylene | 4 | 4+ | 4 |
| Viscosity in 50% Xylene | 4.3 Stokes, Q | 1.6 Stokes, G | 14.4 Stokes, X½ |
| Acid Value 100% Solids | 6.7 | 3.8 | 9.8 |
| Sward Hardness of Steel Panels (as in Table II) | | | |
| 5 min. | 10 | 6 | 13 |
| 10 min. | 11 | 6 | 20 |
| 15 min. | 31 | 11 | 40 |
| 30 min. | 46 | 29 | 41 |

TABLE IV

| Treatment | D | E | F | G |
|---|---|---|---|---|
| Immersed in boiling water for 30 min. | Bad blistering (tiny blisters). Recovered after 45 min. | Somewhat less blistering than in D. Recovered after 45 min. | Several large blisters. Film removed where it has blistered. | No blistering. |
| Immersed in cold water for 24 hours. | Not affected | Not affected | Not affected | Not affected. |
| Immersed in 2% aq. NaOH at 25° C. for 30 min. | 75% of film removed | 10% of film removed | 15% of film removed | Do. |

After overnight immersion in water, the coated product of [I] *L* was white in appearance, but products H and J did not turn white.

The Sward hardness results after baking of products of tests at 300° F. and at 400° F are shown in the accompanying figures which represent these values graphically and which show the superiority of the products made according to this invention.

Having now described the invention, what is claimed is:

1. A process for making a coating resin which comprises:

a. admixing a polyunsaturated, unconjugated fatty acid-providing substance *chosen from the group consisting of linoleic acid, safflower oil, sunflower oil, walnut oil, soy oil, linoleic acid-enriched tall oil fatty acids and segregated cottonseed oil fatty acids* and b. an esterification component which is an epoxy resin liquid at the temperature of reaction or an alkyd resin forming mixture of a polyhydric alcohol and a polybasic carboxylic acid-providing material, c. heating said admixture to a temperature of from 425° F. to 550° F. to cause said substance and said resin or alkyd-forming mixture to react, d. bubbling sulfur dioxide gas through said admixture [all] during *at least a final portion of* step [s] c and *all during* step e, [and]

e. reacting said substance and said resin or alkyd-forming mixture to form a conjugated resin having an increased proportion of trans trans conjugation as compared with a conjugated product not reacted in the presence of sulfur dioxide, and also having many isolated trans bonds, *and*

*f. then, when a desired acid value and conjugation have been attained, discontinuing flow of sulfur dioxide, purging sulfur dioxide from said conjugated resin by blowing with inert gas, and* recovering said conjugated resin.

2. The process of claim 1 wherein said fatty acid-providing substance is linoleic acid.

3. The process of claim 1 wherein said acid-providing substance is linoleic acid-enriched tall oil fatty acid containing about 81 percent linoleic acid.

4. The process of claim 1 wherein said fatty acid-providing substance is nonbreak safflower oil.

5. The process of claim 1 wherein said esterification component is epoxy resin having a weight per epoxy group of from 875 to 1,025 and a Gardner-Holdt viscosity of from R to U at 40 percent nonvolatile in diethylene glycol monobutyl ether.

6. The process of claim 1 wherein said esterification component is a mixture of glycerol and a carboxylic acid providing material selected from the group consisting of phthalic acid, isophthalic acid and phthalic anhydride.

7. The process of claim 1 wherein said fatty acid-providing substance is nonbreak safflower and said esterification component is glycerol and isophthalic acid.

8. The process of claim 1 wherein said sulfur dioxide gas is added at a rate of from 0.1 to 2.0 liters per minute per 1000 grams of reaction admixture.

9. The process of claim 1 wherein said polyhydric alcohol is glycerol.

10. The process of claim 1 wherein said polybasic acid-providing material is selected from the group consisting of phthalic acid, isophthalic acid and phthalic anhydride.

11. A process for making a coating resin which comprises:

a. preparing an admixture of nonconjugated safflower oil and isophthalic acid, b. heating said admixture to provide a liquid reaction mass and to form a partial glyceride of fatty acids and isophthalic acid, c. then reducing the temperature of said reaction mass to 430° F. and heating at said latter temperature *with glycerol* to effect esterification and to form a resin of the desired properties, and d. bubbling sulfur dioxide gas through said reaction mass during both said heatings at a rate of about 2 liters per minute of sulfur dioxide per 2,500 grams of said reaction mixture *until said resin of desired properties and desired conjugation is obtained, as indicated by a desired degree of viscosity and a desired level of acid value, then discontinuing flow of sulfur dioxide and purging said reaction mass by blowing with inert gas.*

12. A process for making a coating resin exhibiting higher than normal trans-trans conjugation which comprises:

a. preparing an admixture of linoleic acid-enriched tall oil containing about 81% linoleic acid and an epoxy resin having a molecular weight per epoxy group of from 875 to 1,025 and a Gardner-Holdt viscosity of from R to U at 40 percent nonvolatile in Butyl carbitol, to form a reaction mixture, b. heating said reaction mixture at 500° F. to cause reaction, and c. bubbling sulfur dioxide gas therethrough *during a final portion of said* heating, at a rate of two liters per minute per 2,400 grams of said reaction mixture until the reaction product exhibits the desired acid number and viscosity *then discontinuing flow of sulfur dioxide and purging said reaction mixture by blowing with inert gas,* and d. recovering said product.

13. The coating resin resulting from the product of claim 12, characterized by lower acid number and lower viscosity than resin made by treating the linoleic acid-enriched tall oil fatty acids with sulfur dioxide before reacting it with the epoxy resin.

14. The coating resin resulting from the process of claim 1.

15. The coating resin resulting from the process of claim 11.

*16. A process for making a coating resin which comprises:*

*a. admixing a polyunsaturated, unconjugated fatty acid-providing substance chosen from the group consisting of linoleic acid, safflower oil, walnut oil, sunflower oil, soy oil, linoleic-acid-enriched tall oil fatty acids and segregated cottonseed oil fatty acids, and*

*b. an esterification component which is an alkyd resin-forming mixture of glycerol and a polybasic carboxylic acid-providing material,*

*c. heating said admixture to a temperature of from 425° F. to 550° F. to cause said substance and said alkyd-forming mixture to react,*

*d. bubbling sulfur dioxide gas through said admixture during at least a final portion of step c and during all of step e, and*

*e. reacting said substance and said alkyd-forming mixture to form a conjugated resin having an increased proportion of trans trans conjugation as compared with a conjugated product not reacted in the presence of sulfur dioxide, and also having many isolated trans bonds,*

*f. then, when the desired conjugation, viscosity, and acid value have been attained, discontinuing flow of sulfur dioxide, purging sulfur dioxide from said con-*

*jugated resin by blowing with inert gas, and*

*g. recovering said conjugated resin.*

*17. A process as in claim 16 wherein said polybasic carboxylic acid-providing material is chosen from the group consisting of phthalic acid, isophthalic acid and phthalic anhydride.*

*18. The coating resin resulting from the process of claim 16.*

* * * * *